(12) United States Patent
Ishikawa (10) Patent No.: US 9,431,950 B2
(45) Date of Patent: Aug. 30, 2016

(54) MOTOR APPARATUS

(71) Applicant: DENSO CORPORATION, Kariya, Aichi-pref. (JP)

(72) Inventor: Tomokazu Ishikawa, Nagoya (JP)

(73) Assignee: DENSO CORPORATION, Kariya (JP)

( * ) Notice: Subject to any disclaimer, the term of this patent is extended or adjusted under 35 U.S.C. 154(b) by 61 days.

(21) Appl. No.: 13/684,820

(22) Filed: Nov. 26, 2012

(65) Prior Publication Data

US 2013/0134920 A1    May 30, 2013

(30) Foreign Application Priority Data

Nov. 25, 2011    (JP) ................................. 2011-256977

(51) Int. Cl.
*H02P 25/08*    (2016.01)

(52) U.S. Cl.
CPC .......... *H02P 25/082* (2013.01); *H02P 25/0925* (2016.02)

(58) Field of Classification Search
CPC ...................................... H02P 25/08
USPC ....................... 318/254.1, 701, 445, 461, 484
See application file for complete search history.

(56) References Cited

U.S. PATENT DOCUMENTS

| | | | | |
|---|---|---|---|---|
| 4,760,316 A | * | 7/1988 | Hedlund | ................... 318/400.01 |
| 5,010,267 A | * | 4/1991 | Lipo | ....................... H02K 29/06 |
| | | | | 310/162 |
| 5,079,494 A | * | 1/1992 | Reichard | ....................... 318/811 |
| 5,545,938 A | | 8/1996 | Mecrow | |
| 5,739,662 A | * | 4/1998 | Li | ................................. 318/701 |
| 5,945,801 A | * | 8/1999 | Yamada et al. | ............... 318/701 |
| 2010/0123426 A1 | | 5/2010 | Nashiki et al. | |

FOREIGN PATENT DOCUMENTS

| | | |
|---|---|---|
| JP | 03-145989 | 6/1991 |
| JP | 9-252588 | 9/1997 |
| JP | 3157162 | 2/2001 |
| JP | 2002-199769 | 7/2002 |
| JP | 2002-335687 | 11/2002 |
| JP | 2010-268632 | 11/2010 |

OTHER PUBLICATIONS

Office Action (1 page) dated Oct. 22, 2013, issued in corresponding Japanese Application No. 2011-256977 and English translation (1 page).
Office Action (2 pages) mailed Apr. 1, 2014, issued in corresponding Japanese Application No. 2011-256977 and English translation (2 pages).
Office Action (2 pages) dated Oct. 21, 2014, issued in corresponding Japanese Application No. 2011-256977 and English translation (2 pages).

\* cited by examiner

*Primary Examiner* — Bentsu Ro
(74) *Attorney, Agent, or Firm* — Nixon & Vanderhye P.C.

(57) ABSTRACT

A motor apparatus includes a full-pitch winding type reluctance motor which has three phase coils formed of full-pitch windings, and a controller which controls applying current to each coil of the three phases. When changing from a state where current is applied to a first phase coil and a second phase coil to a state where current is applied to a third phase coil and the first phase coil, the controller displaces the timing when decreasing the current of the second phase coil is started and the timing when increasing the current of the third phase coil is started from each other.

7 Claims, 9 Drawing Sheets

A PHASE CURRENT Ia $\theta$ re

FIG.5B

B PHASE CURRENT Ib $\theta$ re

FIG.5C

C PHASE CURRENT Ic $\theta$ re

B PHASE ON
C PHASE OFF

FIG.6A

A PHASE CURRENT Ia $\theta$ re

FIG.6B

B PHASE CURRENT Ib $\theta$ re

FIG.6C

C PHASE CURRENT Ic $\theta$ re

C PHASE OFF
B PHASE ON

CURRENT COMPONENTS WHICH DO NOT CONTRIBUTE TO TORQUE

GENERAL-PURPOSE
THREE-PHASE INVERTER

GENERAL-PURPOSE
THREE-PHASE INVERTER

| ANGLE (degree) | 0 | 30 | 60 | 90 | 120 | 150 | 180 | 210 | 240 | 270 | 300 | 330 | 360 |
|---|---|---|---|---|---|---|---|---|---|---|---|---|---|
| A PHASE | | on | | off | | on | | off | | on | | off | | on | | off |
| B PHASE | off | | on | | off | | on | | off | | on | | off | | on |
| C PHASE | on | off | | on | | off | | on | | off | | on | | off | on |

MOTOR APPARATUS

CROSS-REFERENCE TO RELATED APPLICATION

This application is based on and claims the benefit of priority from earlier Japanese Patent Application No. 2011-256977 filed Nov. 25, 2011, the description of which is incorporated herein by reference.

BACKGROUND

1. Technical Field

The present invention relates to a motor apparatus including a reluctance motor and a controller controlling the driving of the reluctance motor.

2. Related Art

Figure 12A:
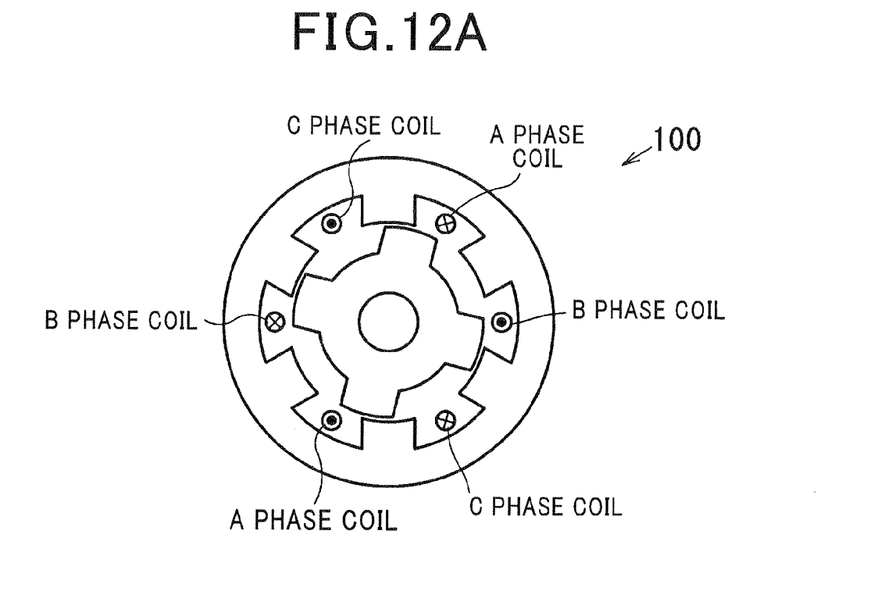
FIG. 12A is a schematic view showing a configuration of a full-pitch winding type reluctance motor according to a conventional art.

FIG. 12A shows a known full-pitch winding type three-phase reluctance motor (refer to Japanese Patent No. 3157162). A full-pitch winding type three-phase reluctance motor 100 generates torque by using mutual inductance when current is applied to two of the three phase coils.

However, in a case of the full-pitch winding type, since magnetic fluxes generated by applying current interlink with the windings of all phases, inductive voltage is generated in the winding of each phase, which complicates the control.

Especially in the high-speed rotation region, since the inductive voltage becomes larger, current control becomes complicate due to the influence of the mutual inductance. Hence, generating appropriate torque becomes difficult.

Figure 12B:
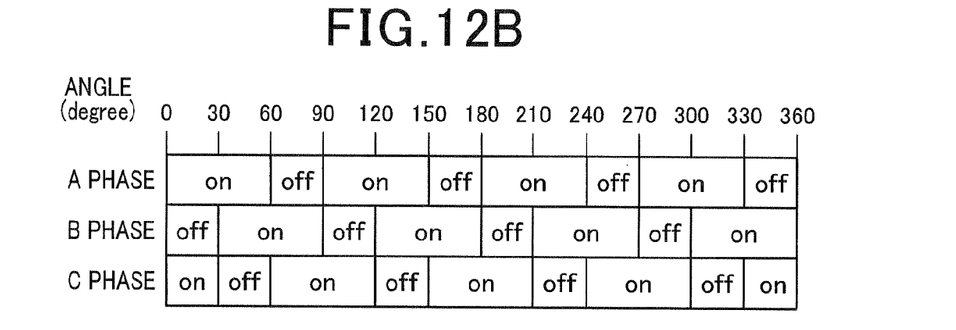
FIG. 12B is a diagram for explaining a current-carrying order of the phase coils according to the conventional art.

For example, according to the control disclosed in Japanese Patent No. 3157162, as shown in FIG. 12B, when changing from a state where current is applied to an A phase coil and a C phase coil to a state where current is applied to the A phase coil and a B phase coil, decreasing the current applied to the C phase coil and increasing the current applied to the B phase coil are simultaneously started.

In this case, after the change, magnetic fluxes generated by the current of the windings of the A phase and the B phase act in a predetermined direction so as to prevent the current of the C phase coil from decreasing. Hence, current components which do not contribute to the torque remain in the C phase coil, thereby decreasing the torque. As a result, desired torque cannot be obtained.

SUMMARY

An embodiment provides a motor apparatus decreasing the influence of mutual inductance in a full-pitch winding type three-phase reluctance motor.

As an aspect of the embodiment, a motor apparatus includes a full-pitch winding type reluctance motor which has three phase coils formed of full-pitch windings, and a controller which controls applying current to each coil of the three phases. When changing from a state where current is applied to a first phase coil and a second phase coil to a state where current is applied to a third phase coil and the first phase coil, the controller displaces the timing when decreasing the current of the second phase coil is started and the timing when increasing the current of the third phase coil is started from each other.

DETAILED DESCRIPTION OF THE PREFERRED EMBODIMENTS

With reference to the accompanying drawings, hereinafter will be described some embodiments of the present invention.

(First Embodiment)

Configuration of the First Embodiment:

A motor apparatus 1 of the first embodiment is described with reference to FIGS. 1 to 7.

Figure 1:
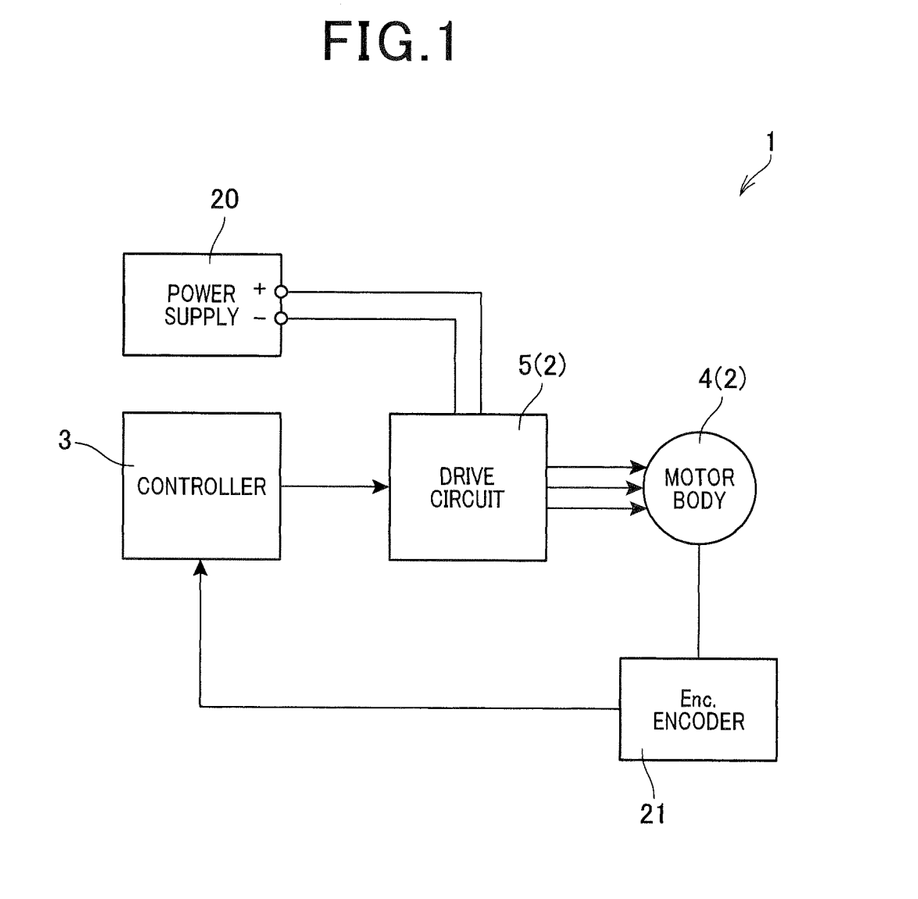
FIG. 1 is a schematic view showing a configuration of a motor apparatus according to a first embodiment.

The motor apparatus 1 includes a full-pitch winding type reluctance motor (hereinafter, referred to as "motor 2") and a controller 3. The motor 2 has three phase coils formed of full-pitch windings. The controller 3 performs control for applying current to each coil of the three phases.

The motor 2 is a known switched reluctance motor and includes a motor body 4 and a drive circuit 5 connected to the motor body 4.

Figure 2A:
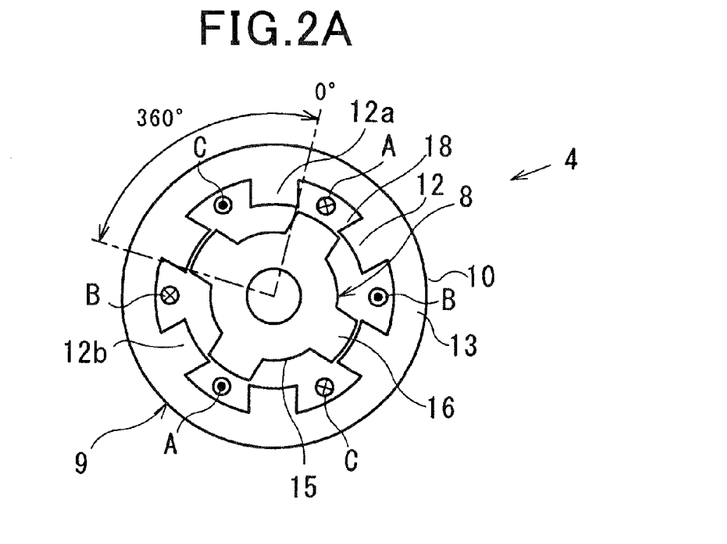
FIG. 2A is a schematic view showing a configuration of a full-pitch winding type reluctance motor according to the first embodiment.
Figure 2B:
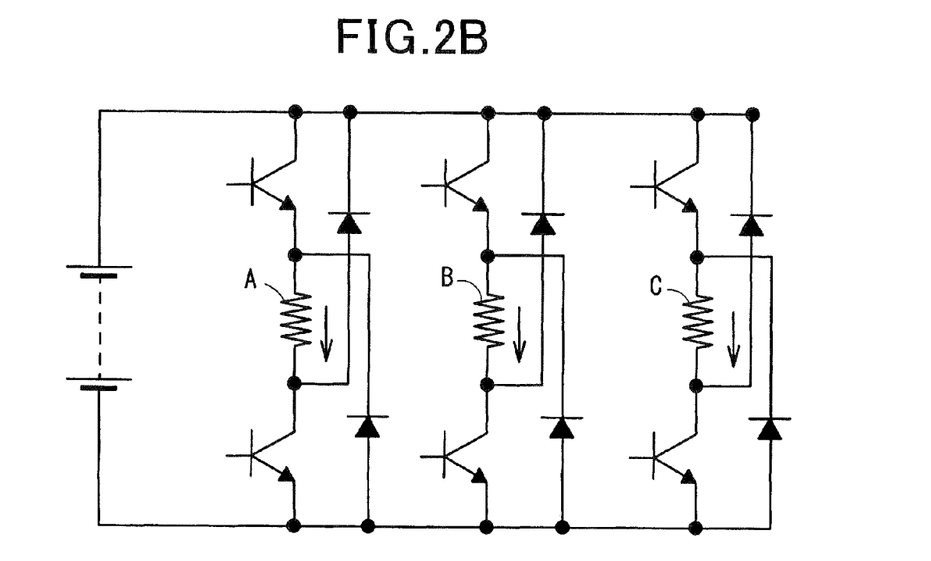
FIG. 2B is a circuit diagram of a drive circuit according to the first embodiment.

The motor body 4 has a rotor 8 which is rotatably supported and a stator 9 disposed at the outer periphery side of the rotor 8 so as to surround the rotor 8.

The stator 9 has a stator core 10 which is cylindrically formed by using laminated magnetic steel sheets and three phase coils which are wound in a full-pitch manner in the stator core 10. The coils are connected to the drive circuit 5.

The stator core 10 includes stator teeth (stator salient poles) 12 and a back yoke 13. The stator teeth 12 are arranged at regular intervals within an electrical angle of 360 degrees. The number of the stator teeth 12 is obtained by: 6×m (m is an integer which is 1 or more). The back yoke 13 magnetically connects the stator teeth 12.

The rotor 8 is formed of a rotor core 15 which is cylindrically formed by using laminated magnetic steel sheets. The rotor core 15 is provided with rotor teeth (rotor salient poles) which are arranged at regular intervals within an electrical angle of 360 degrees. The number of the rotor teeth 16 is obtained by: 2×n (n is an integer which is 1 or more).

Note that, in the present embodiment, the number of the stator teeth 12 is six, and the number of the rotor teeth 16 is four.

The stator core 10 and the rotor core 15 are coaxially arranged. The stator teeth 12 and the rotor teeth 16 are arranged in the radial direction so as to be opposed to each other with an air gap being interposed therebetween.

The three phase coils (A phase coil A, B phase coil B, C phase coil C) are arranged in slots 18, which are formed between the adjacent stator teeth 12, by using a full-pitch concentrated winding method.

In particular, each of the A phase coil A, the B phase coil B, and the C phase coil C is subject to concentrated winding in the two slots 18 opposed to each other at a mechanical angle of 180 degrees in the rotation direction. Each of the phase coils A to C is wound in the positive direction and in one of the two slots 18 and is wound in the negative direction and in the other of the two slots 18. The two slots 18 are opposed to each other at 180 degrees.

The phase coils arranged in the circumferential direction are wound so that the winding directions thereof are reversed in series. In a state where current is applied to the adjacent two phase coils, the current flows through the two phase coils in the inverse directions.

The drive circuit 5 is connected to a power supply 20. The drive circuit 5 supplies electric power to the phase coils A to C to drive the phase coils A to C. The drive circuit 5 is controlled by the controller 3. The drive circuit 5 of the present embodiment is used in a general switched reluctance motor and is referred to as an asymmetric H bridge circuit (refer to FIG. 2B).

The controller 3 controls ON/OFF of switches in the drive circuit 5 depending on information received from the encoder 21 which reads a rotation angle of the motor body 4, thereby applying current having a predetermined current-carrying pattern to each of the phase coils A to C.

That is, when using a three-phase switched reluctance motor, the controller 3 performs control so as to apply current to the two phase coils. For example, when the rotor core 15 is in a position shown in FIG. 2A, the A phase coil A and the C phase coil C are in current-carrying states. Thereafter, current is applied to the B phase coil B and the A phase coil A. This operation is repeated in the rotation direction, thereby rotating the rotor 8.

(Features of the First Embodiment)

When a phase coil is defined as a first phase coil, phase coils adjacent to each other in the rotation direction are defined as a second phase coil and a third phase coil in turn.

In the present embodiment, for example, when changing from a state where current is applied to the A phase coil A (first phase coil) and the C phase coil C (second phase coil) to a state where current is applied to the B phase coil B (third phase coil) and the A phase coil A (first phase coil), the controller 3 performs current-carrying control so that the timing when decreasing the current of the C phase coil C (second phase coil) is started and the timing when increasing the current of the B phase coil B (third phase coil) is started are displaced from each other.

Similarly, when changing from a state where current is applied to the B phase coil B (first phase coil) and the A phase coil A (second phase coil) to a state where current is applied to the C phase coil C (third phase coil) and the B phase coil B (first phase coil), the timing when decreasing the current of the A phase coil A (second phase coil) is started and the timing when increasing the current of the C phase coil C (third phase coil) is started are displaced from each other.

The position at which the stator teeth 12a between the A phase coil A and the C phase coil C start overlapping the rotor teeth 16 is defined as an electric angle of 0 degrees.

Figure 3:
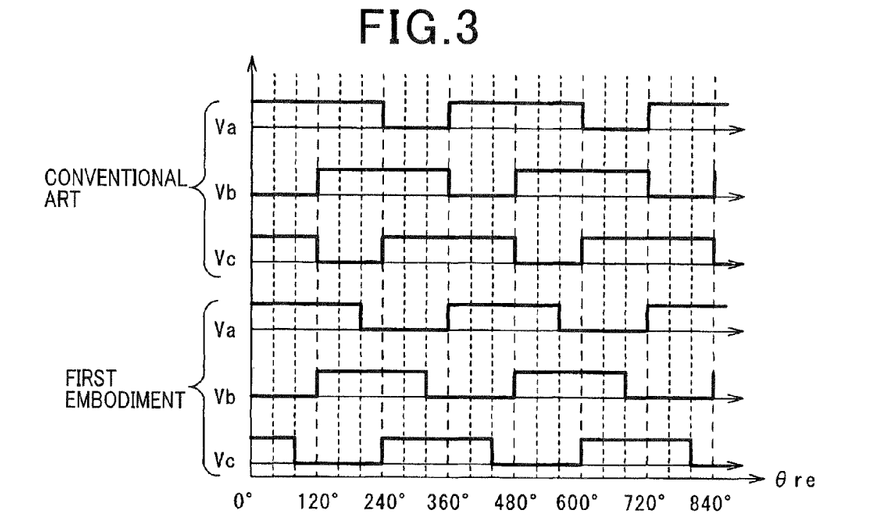
FIG. 3 is a time chart showing current-carrying patterns of phase coils, comparing with a conventional art, according to the first embodiment.

In a conventional art, as shown in FIG. 3, at an electric angle of 120 degrees at which the rotor teeth 16 start overlapping the stator teeth 12b between the B phase coil B and the A phase coil A, current-carrying OFF of the C phase coil C and current-carrying ON of the B phase coil B are simultaneously performed.

However, in the present embodiment, the phase at which the current-carrying of the C phase coil C is turned off is advanced, whereby decreasing the current of the C phase coil C is started before the electric angle of 120 degrees. Then, the current-carrying of the B phase coil B is turned on at the electric angle of 120 degrees.

Similarly, after the electric angle of 120 degrees, the timing when decreasing the current of the phase coils A to C is started and the timing when increasing the current of the phase coils A to C is started are displaced from each other.

Figure 4:
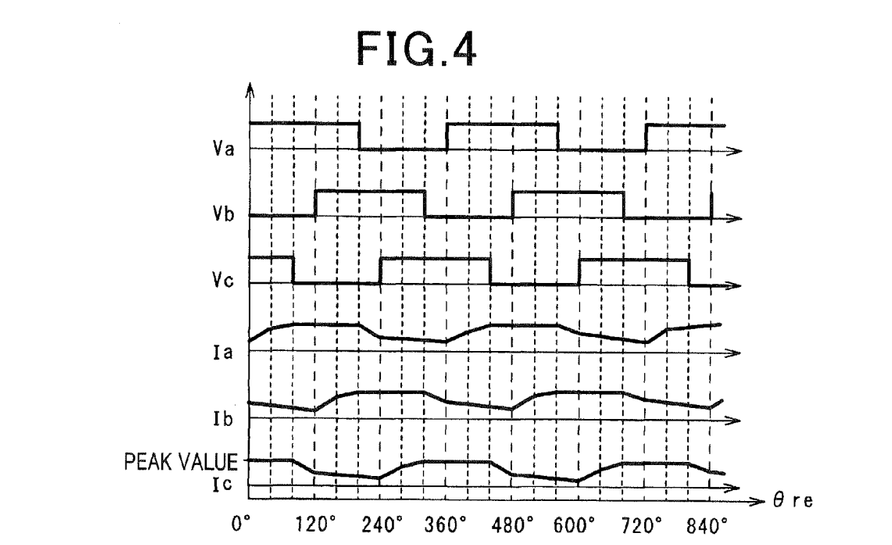
FIG. 4 shows current-carrying patterns and current waveforms of the phase coils according to the first embodiment.

Note that, as shown in FIG. 4, the phase at which the current-carrying of the C phase coil C is turned off is set so that when the current-carrying of the C phase coil C is turned off, current Ic flowing through the C phase coil C starts decreasing, and when the current has decreased by a predetermined amount with respect to a peak value, the current-carrying of the B phase coil B can be turned on at a position of the electric angle of 120 degrees.

In the present embodiment, for example, when the current Ic has decreased by about 30% of the peak value, the timing of current-carrying OFF of the C phase coil C and the timing of current-carrying ON of the B phase coil B are displaced from each other so that the current-carrying of the B phase coil B is turned on.

(Advantages of the First Embodiment)

In the present embodiment, when changing from a state where current is applied to the first phase coil and the second phase coil to a state where current is applied to the third phase coil and the first phase coil, the timing of current-carrying OFF of the second phase coil and the timing of current-carrying ON of the third phase coil are displaced from each other.

Figure 5A:
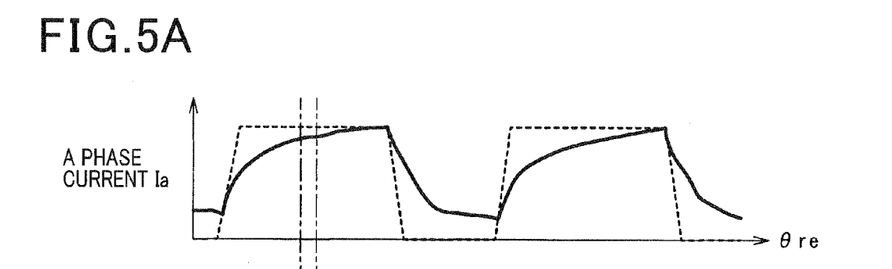
FIG. 5A shows a current-carrying pattern and a current waveform of an A phase coil according to the first embodiment.
Figure 5B:
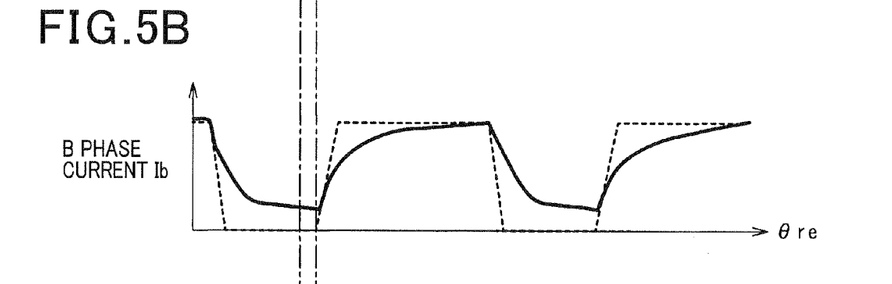
FIG. 5B shows a current-carrying pattern and a current waveform of a B phase coil according to the first embodiment.
Figure 5C:
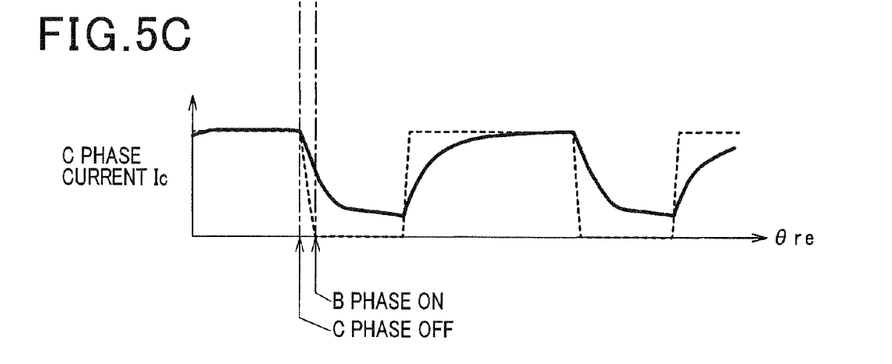
FIG. 5C shows a current-carrying pattern and a current waveform of a C phase coil according to the first embodiment.

That is, for example, as shown in FIGS. 5A to 5C, when changing from a state where current is applied to the A phase coil A and the C phase coil C to a state where current is applied to the B phase coil B and the A phase coil A, the timing of current-carrying OFF of the C phase coil C and the timing of current-carrying ON of the B phase coil B are displaced from each other so that current-carrying of the B phase coil B is turned on, after the current-carrying of the C phase coil C is turned off (decreasing the current is started) and then the current Ic of the C phase coil C is decreased by a predetermined amount.

Figure 6A:
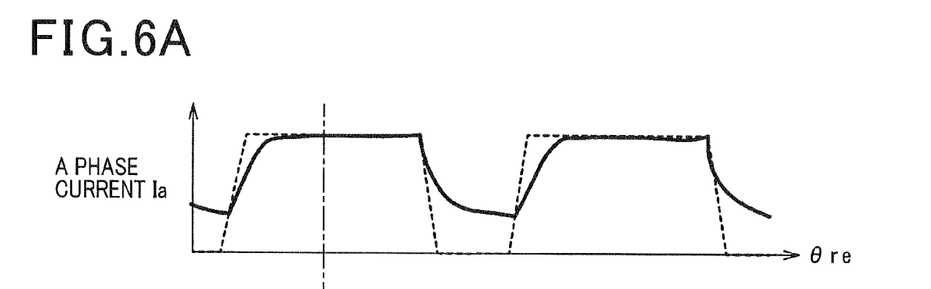
FIG. 6A shows a current-carrying pattern and a current waveform of an A phase coil according to a conventional art.
Figure 6B:
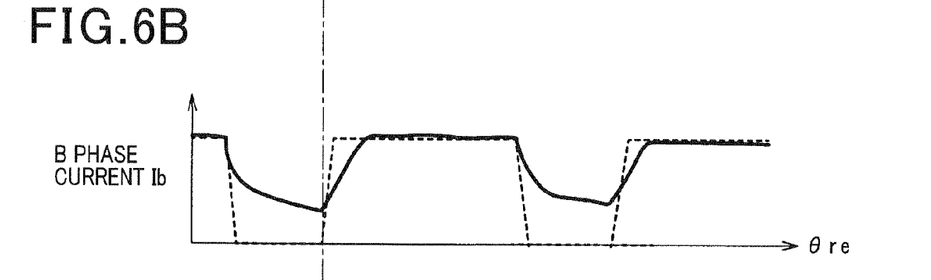
FIG. 6B shows a current-carrying pattern and a current waveform of a B phase coil according to the conventional art.
Figure 6C:
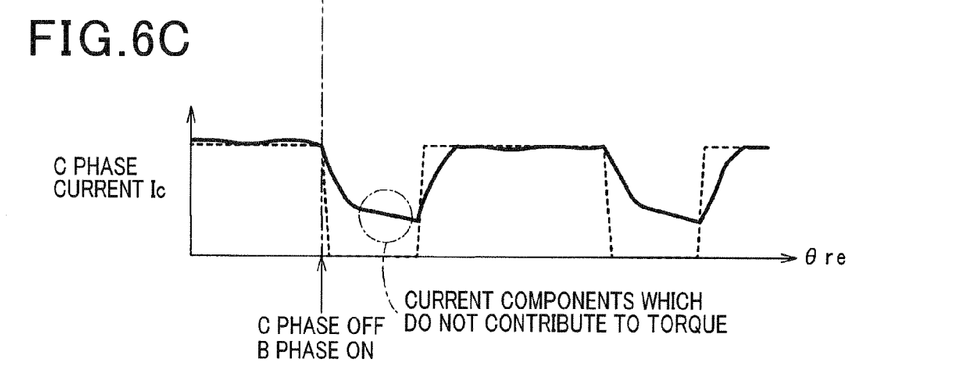
FIG. 6C shows a current-carrying pattern and a current waveform of a C phase coil according to the conventional art.

In a conventional art, for example, as shown in FIGS. 6A to 6C, when changing from a state where current is applied to the A phase coil A and the C phase coil C to a state where current is applied to the B phase coil B and the A phase coil A, the timing of current-carrying OFF of the C phase coil C and the timing of current-carrying ON of the B phase coil B are the same.

In this case, even after the current-carrying OFF of the C phase coil C, current components which do not contribute to the torque remain in the C phase coil C due to the influence of the mutual inductance. As a result, the torque is decreased.

In contrast, according to the present embodiment, as shown in FIGS. 5A to 5C, after the current-carrying OFF of the C phase coil C, current components, which flows through the C phase coil C and do not contribute to the torque, can be decreased. As a result, the torque can be prevented from decreasing.

Figure 7:
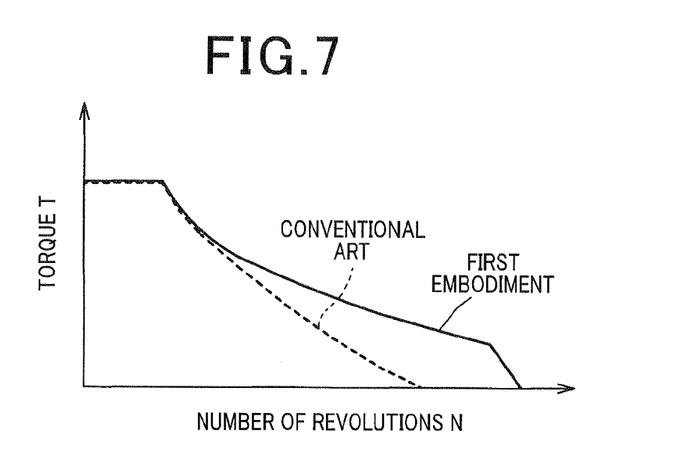
FIG. 7 is a diagram for explaining a relationship between the number of revolutions and output torque of a motor, comparing with a conventional art, according to the first embodiment.

The current components which do not contribute to the torque are generated, in specific, during high-speed rotation. Hence, as shown in FIG. 7, the torque can be increased during high-speed rotation, compared with the conventional art.

Note that, in the first embodiment, when changing from a state where current is applied to the A phase coil A (first phase coil) and the C phase coil C (second phase coil) to a state where current is applied to the B phase coil B (third phase coil) and the A phase coil A (first phase coil), the current-carrying of the B phase coil B is turned on at an electric angle of 120 degrees at which the rotor tooth 16 starts overlapping the stator tooth 12b between the B phase coil B (third phase coil) and the A phase coil A (first phase coil).

However, considering the delay in current change caused during high-speed rotation, the timing of the current-carrying ON (start of increasing current) of the B phase coil B may be earlier than the electric angle of 120 degrees at which the rotor tooth 16 starts overlapping the stator tooth 12b. Note that the timing of current-carrying OFF of the C phase coil C and the timing of current-carrying ON of the B phase coil B are displaced from each other.

In addition, the phase at which the current-carrying of the second phase coil is turned off may be further advanced compared with the first embodiment. In this case, the timing at which the current-carrying of the second phase coil is turned off has not to be the same as the timing at which the current-carrying of another phase coil is turned on.

An example is explained focusing on the timing at which the current-carrying of the B phase coil B is turned off.

Figure 8:
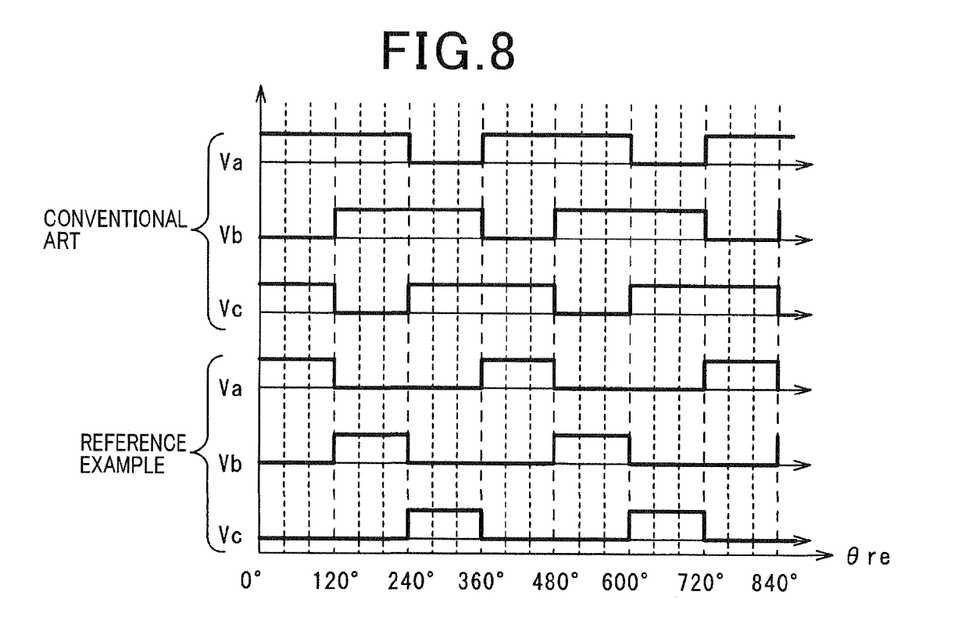
FIG. 8 is a time chart showing current-carrying patterns of phase coils, comparing with a conventional art, according to a reference example.

In a conventional art, the current-carrying of the B phase coil B is turned off at an electrical angle of 360 degrees which is the timing at which the current-carrying of the A phase coil A is turned on. In contrast, in the present embodiment, the current-carrying of the B phase coil B is turned off at a phase earlier than the electrical angle of 360 degrees. However, if the timing at which the current-carrying of the B phase coil B is turned off is advanced to 240 degrees, as shown in a reference example of FIG. 8, the timing at which the current-carrying of the B phase coil B is turned off becomes the same as the timing at which the current-carrying of the C phase coil C is turned on.

Therefore, the timing at which the current-carrying of the B phase coil B is turned off has to be the phase later than 240 degrees and earlier than 360 degrees.

(Second Embodiment)

Figure 9:
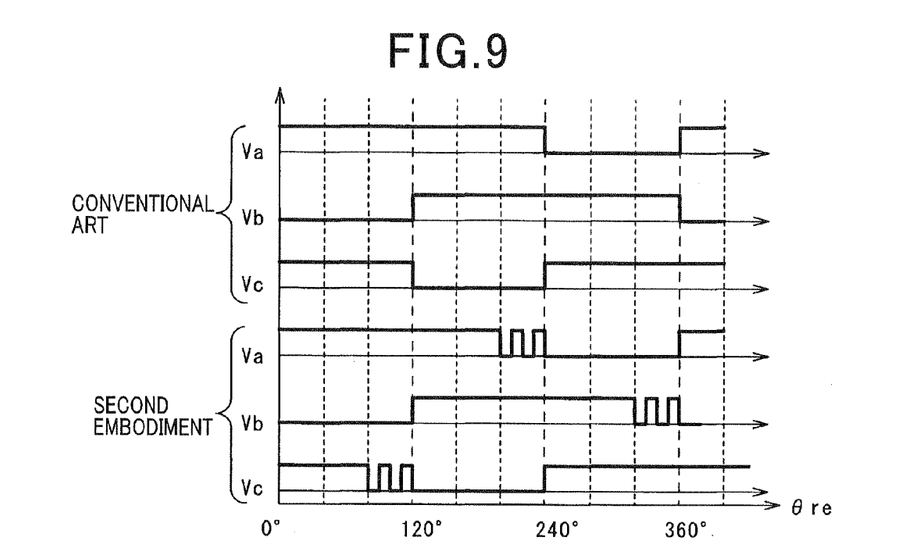
FIG. 9 is a time chart showing current-carrying patterns of phase coils, comparing with a conventional art, according to a second embodiment.

The motor apparatus 1 of the second embodiment is described with reference to FIG. 9, focusing on matters different from those of the first embodiment.

In the present embodiment, when changing from a state where current is applied to the first phase coil and the second phase coil to a state where current is applied to the third phase coil and the first phase coil, the current of the first phase coil may be decreased under duty control.

Even in this case, the timing when decreasing the current of the second phase coil (e.g. C phase coil C) is started (starting point of the duty control) and the timing when increasing the current of the third phase coil (e.g. B phase coil B) is started are displaced from each other, as in the case of the first embodiment.

According to the second embodiment, the same advantages as those of the first embodiment can be obtained.

(Third Embodiment)

The motor apparatus 1 of the third embodiment is described with reference to FIG. 10, focusing on the matters different from those of the first embodiment.

In the first embodiment, the phase at which the current-carrying of the second phase coil (e.g. C phase coil C) is turned off is advanced, and decreasing the current of the C phase coil C is started before the electric angle of 120 degrees at which the current-carrying of the third phase coil (e.g. B phase coil B) is turned on.

Figure 10:
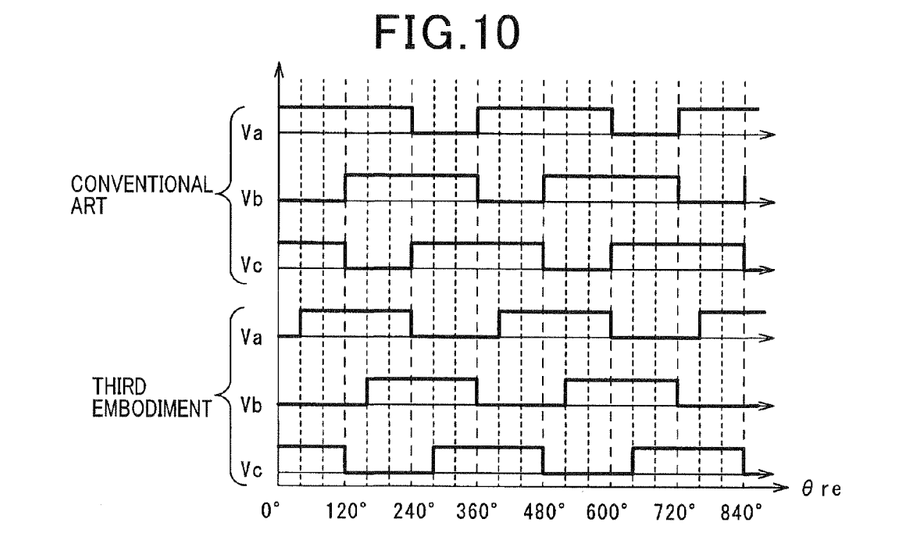
FIG. 10 is a time chart showing current-carrying patterns of phase coils, comparing with a conventional art, according to a third embodiment.

However, in the present embodiment, as shown in FIG. 10, the phase at which the current-carrying of the second phase coil (e.g. C phase coil C) is turned off is the same as that of a conventional art, and the phase at which the current-carrying of the third phase coil (e.g. B phase coil B) is turned on is delayed.

According to the third embodiment, the same advantages as those of the first embodiment can be obtained.

Note that, as a modification of the present embodiment, considering the delay in current change caused during high-speed rotation, the timing of the current-carrying OFF of the C phase coil C (start of decreasing current) may be earlier than the electric angle of 120 degrees at which the rotor tooth 16 finishes overlapping the stator tooth 12a.

(Modifications)

In the first embodiment, the motor body 4 is an inner rotor type. The motor body 4 may have a structure of a full-pitch winding type reluctance motor. For example, the motor body 4 may be an outer rotor type in which the rotor 8 is disposed outside the stator 9.

The configuration of the drive circuit 5 is not limited to the above embodiments and has various aspects.

Figure 11A:
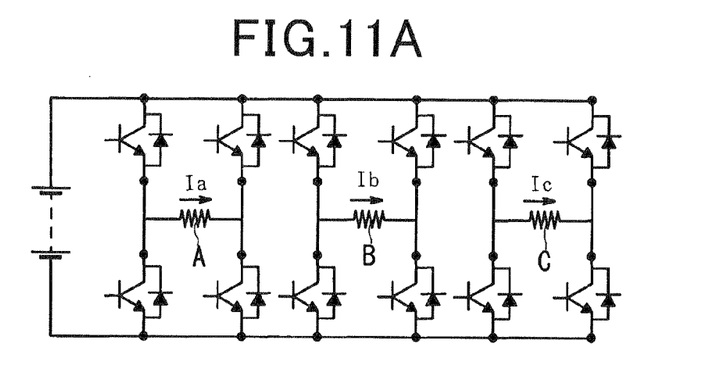
FIG. 11A is a circuit diagram of a drive circuit according to a modification.
Figure 11B:
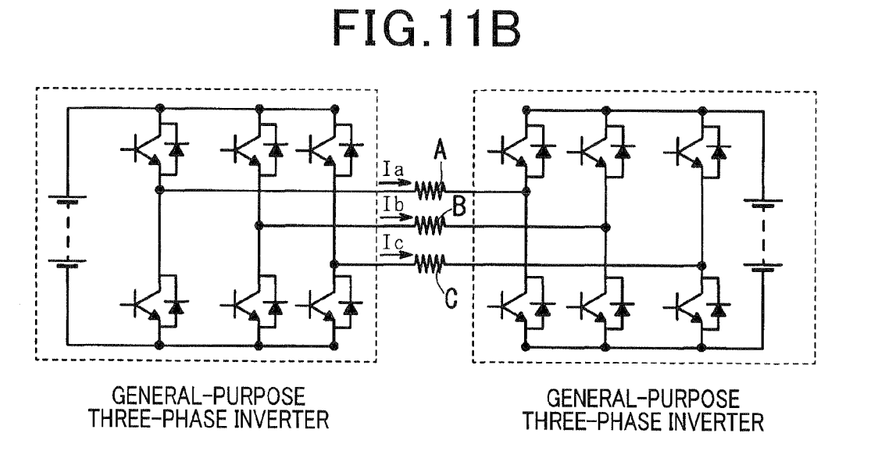
FIG. 11B is a circuit diagram of a drive circuit according to a modification.

For example, the drive circuit 5 may be a full H bridge circuit shown in FIG. 11A or a circuit shown in FIG. 11B in which two general-purpose three-phase inverter are combined together.

It will be appreciated that the present invention is not limited to the configurations described above, but any and all modifications, variations or equivalents, which may occur to those who are skilled in the art, should be considered to fall within the scope of the present invention.

Hereinafter, aspects of the above-described embodiments will be summarized.

The motor apparatus includes a full-pitch winding type reluctance motor which has three phase coils formed of full-pitch windings, and a controller which controls applying current to each coil of the three phases.

When changing from a state where current is applied to a first phase coil and a second phase coil to a state where current is applied to a third phase coil and the first phase coil, the controller displaces the timing when decreasing the current of the second phase coil is started and the timing when increasing the current of the third phase coil is started from each other.

If the timing when decreasing the current of the second phase coil is started and the timing when increasing the current of the third phase coil is started are the same, current components which do not contribute to the torque remain in the second phase coil. However, according to the motor apparatus, for example, increasing the current of the third phase coil is started after the current of the second phase coil is decreased to some extent. Thereby, current components, which do not contribute to the torque generated in the second phase coil, can be decreased. That is, the influence of mutual inductance can be decreased.

In the motor apparatus, when changing from a state where current is applied to the first phase coil and the second phase coil to a state where current is applied to the third phase coil and the first phase coil, the controller starts increasing the current of the third phase coil, after decreasing the current of the second phase coil is started and then the current of the second phase coil is decreased by a predetermined amount.

Thereby, current components, which do not contribute to the torque generated in the second phase coil, can be decreased. That is, the influence of mutual inductance can be decreased.

In the motor apparatus, the timing of the start of increasing the current of the third phase coil is earlier than the timing when a stator salient pole between the third phase coil and the first phase coil starts overlapping a rotor salient pole.

Since current change is delayed during high-speed rotation, the timing when increasing the current is started is advanced in consideration of the delay. Thereby, controllability is improved.

In the motor apparatus, the timing of the start of decreasing the current of the second phase coil is earlier than the timing when a stator salient pole between the first phase coil and the second phase coil finishes overlapping a rotor salient pole.

Since current change is delayed during high-speed rotation, the timing when decreasing the current is started is advanced in consideration of the delay. Thereby, controllability is improved.

What is claimed is:

1. A motor apparatus, comprising:
a full-pitch winding type reluctance motor which has three phase coils formed of full-pitch windings, wherein inductive voltage will be generated in a winding of each phase of the three phase coils due to magnetic fluxes, generated by applying current, interlinking with the winding of all phase of the three phase coils; and
a controller which controls applying current to each coil of the three phases, wherein
when changing from a state where current is applied to a first phase coil and a second phase coil for generating magnetic fluxes to first torque generating magnetic poles to a state where current is applied to a third phase coil and the first phase coil for generating magnetic fluxes to second torque generating magnetic poles, the controller turns off current-carrying of the second phase coil, while current-carrying of the first phase coil is in an on state, to start decreasing the current of the second phase coil, and then the controller turns on current-carrying of the third phase coil to start increasing the current of the third phase coil.

2. The motor apparatus according to claim 1, wherein when changing from a state where current is applied to the first phase coil and the second phase coil for generating magnetic fluxes to the first torque generating magnetic poles to a state where current is applied to the third phase coil and the first phase coil for generating magnetic fluxes to the second torque generating magnetic poles, the controller starts increasing the current of the third phase coil, after decreasing the current of the second phase coil is started and then the current of the second phase coil is decreased by a predetermined amount.

3. The motor apparatus according to claim 2, wherein the timing of the start of increasing the current of the third phase coil is earlier than the timing when a stator salient pole between the third phase coil and the first phase coil starts overlapping a rotor salient pole.

4. The motor apparatus according to claim 2, wherein the timing of the start of decreasing the current of the second phase coil is earlier than the timing when a stator salient pole between the first phase coil and the second phase coil finishes overlapping a rotor salient pole.

5. The motor apparatus according to claim 1, wherein the timing of the start of increasing the current of the third phase coil is earlier than the timing when a stator salient pole between the third phase coil and the first phase coil starts overlapping a rotor salient pole.

6. The motor apparatus according to claim 1, wherein the timing of the start of decreasing the current of the second phase coil is earlier than the timing when a stator salient pole between the first phase coil and the second phase coil finishes overlapping a rotor salient pole.

7. The motor apparatus according to claim 1, wherein the full-pitch winding type reluctance motor includes a rotor having salient poles and a stator having salient poles.

* * * * *